United States Patent [19]
Hoppert et al.

[11] Patent Number: 5,169,229
[45] Date of Patent: Dec. 8, 1992

[54] ENHANCED METAL FILTER/MIRROR COATINGS FOR USE ON ENGINEERING PLASTICS

[75] Inventors: Bernt D. Hoppert, Lima; Douglas J. LaPlante, Rochester, both of N.Y.

[73] Assignee: Bausch & Lomb Incorporated, Rochester, N.Y.

[21] Appl. No.: 462,675

[22] Filed: Jan. 9, 1990

[51] Int. Cl.⁵ .............................................. F21V 9/00
[52] U.S. Cl. ................................... 362/293; 362/343; 359/589; 359/884
[58] Field of Search ............... 362/293, 296, 341, 350, 362/343; 350/642, 166; 359/589, 603, 884

[56] References Cited

U.S. PATENT DOCUMENTS 4,322,130  3/1982  Ito et al. .............................. 350/642
5,007,710  4/1991  Nakajima et al. .................... 350/642

Primary Examiner—Stephen F. Husar
Attorney, Agent, or Firm—James B. Bieber

[57] ABSTRACT

A device which controls the reflected spectrum of a light source comprised of: a support article made of a plastic which is stable to the temperatures required of such a device; an optical coating deposited upon said support article, said coating consisting essentially of: a highly reflective metal film directly deposited upon said plastic support article and is at least 50 nm in thickness; an array of thin films of alternating high index and low index dielectric materials deposited upon said thin highly reflective metal film, said array being chosen to control the reflected spectrum of said device.

8 Claims, 4 Drawing Sheets

ENHANCED METAL FILTER/MIRROR COATINGS FOR USE ON ENGINEERING PLASTICS

FIELD OF THE INVENTION

The present invention relates to novel thin film arrays used as mirror/filter coatings on high temperature stable engineering plastics. The coating comprises an array or stack of thin films configured in a specific fashion. On the light impingent side of a plastic surface a thin metal film is deposited, preferably a thin film of nickel/chrome alloy. On top of the thin metal a film stack of alternating higher refractive and lower refractive index materials is deposited. The advantages to this film design over the prior art is that the film can be used on a wide variety of plastic materials which can withstand high temperature cycling without major dimensional deformation. Furthermore, this novel film design for plastic articles allows for the control of transmission/reflectance across the spectrum using fewer film layers than the state of the art designs.

BACKGROUND OF THE INVENTION

Thin film technology has been used for a number of years to control the transmittance and/or reflectance of coated surfaces. By controlling the thickness and index of refraction of each film in a stack or array of thin films constituting a coating one can tailor the reflective and transitive characteristics of the coating. The design of such films and the principals used to achieve such results are well known to those skilled in the art as is the general knowledge of how to deposit the various thin films on various substrates.

Various classes of coatings exist based not only upon the materials used to form said coatings, but based upon spectral reflectance characteristics as well. For instance, reflective coatings have long been available which transmit in the infrared region and reflect all or most of the visible portion of the spectrum. Such coatings are known generically as "cold mirrors". Alternately, coatings are also known which transmit the infrared portion of the spectrum and reflect only a a fraction of the visible spectrum. These coatings are generically known as "color correcting cold mirror" coatings.

For many commercial applications such coatings are provided on glass substrates in the form of reflector blanks or filter blanks. However, recently it has become desirable to form filters and reflectors out of plastic materials. See, for instance, U.S. Pat. No. 4,380,794. The use of plastic reflectors poses some problems in that there are many plastic materials which have the heat stability required to be used in such applications, however, there are very few plastic materials which are sufficiently U.V. radiation stable to be suitable. U.S. Pat. No. 4,380,794 teaches that polyetherimide is sufficiently stable to provide a useful reflector material.

The present invention provides a novel optical coating which allows reflectors and other optical apparatus to be made from plastic materials which have been hereto unacceptable due to their U.V. sensitivity.

SUMMARY OF THE INVENTION

The present invention relates to a novel optical coating design which comprises a plurality of thin films deposited upon a plastic substrate in a defined sequence and thickness. The plurality of films comprises a thin metal film deposited directly upon the plastic substrate. Upon the thin metal film is deposited a plurality of thin films of dielectric materials wherein each layer alternates between a higher index material and a lower index material. The thin metal layer effectively reflects and thus shields the substrate from any harmful U.V. radiation which might otherwise impinge upon the plastic reflector while the array of thin dielectric films effectively controls the reflectance/transmittance profile of the coating across the visible/infrared portions of the spectrum. This combination of thin metal film/dielectric array combination allows one to form color neutral or color correcting cold mirrors on plastic substrates.

DETAILED DESCRIPTION OF THE INVENTION

The present invention relates to a novel coating which can be durably applied to a plastic substrate, said coating selectively alters the reflectance of said substrate in order to provide a modified spectrum for that of the light source as desired for a particular application. The coating comprises a highly reflective metal film directly deposited upon said plastic support article and is at least 50 nm in thickness; an array of alternating high index and low index dielectric materials deposited upon said thin highly reflective metal film, said array being chosen to control the reflected spectrum of said device.

Figure 1:
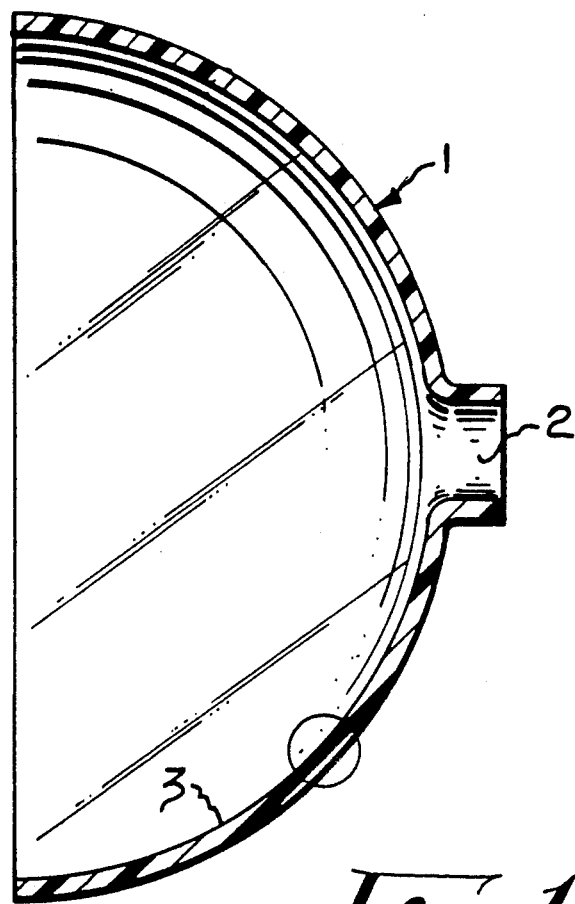
FIG. 1 shows a schematic cross-section of view of the cross-section of a reflector upon which the coating of the present invention has been coated.

A reflector according to the present invention is illustrated in FIG. 1. The body of the reflector 1 is formed in a geometrical fashion so that it provides an opening 2 into which a light source can be introduced. The radiation from this light source is reflected by a reflective coating 3 deposited on the interior portion of the reflector.

Figure 2:
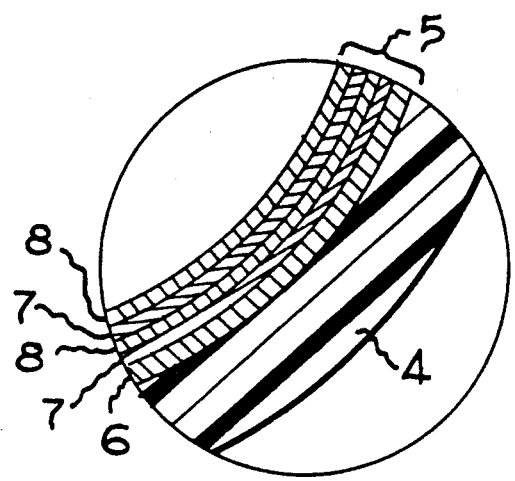
FIG. 2 shows a cross sectional view of a reflector section upon which the coating of the present invention has been deposited.

The coating 3 of the present invention includes an array 5 of thin films deposited on the interior of the reflector as shown in detail in FIG. 2. The array 5 determines that only a portion radiation will be transmitted through or absorbed by the reflector body material which includes a substrate 4 for the coating array 5. The coating comprises a thin highly reflective metal film 6 deposited directly upon the substrate 4, and a series of alternating higher refractive index films materials 7 and lower refractive index film 8.

In general terms, the design of the array of thin films of dielectric materials described above is well known to those skilled in the art. By alternating higher refractive index materials with lower refractive index material those skilled in the art can effect a reflectance or transmittance characteristic as desired by means of controlling constructive and destructive interference at various wavelengths. Combining this effect with the high reflectance characteristics of thin metal films allows one to tailor the reflectance spectrum of the present invention.

One of the advantages of the present invention over the state of the art is that the present invention allows one to apply coatings with selective reflectance spectrums on plastic substrates other than polyetherimide. Furthermore, the present coating is as or more reflective than the state of the art dichroic coatings on polyetherimide.

The substrate can be made from any plastic which is thermally stable within the temperature cycles anticipated for the particular optical device being designed. A number of plastic materials suggest themselves and without providing a complete list, these include polysulfones, polyetherimides, polyarylates, and polycarbonates.

The actual choice of material depends upon the light source, power, the use of the lamp, the expected use life of the lamp and other considerations.

The metal film will be formed in the practice of the present invention on the light impingent side of the article and will vary in thickness from 50 to 500 nm. Various methods can be used to deposit the thin metal film on the substrate although in our practice vapor deposition in a partial atmosphere has been the preferred method. However, sputtering methods can also be employed.

Various types of metals can be used to form this first substrate adherent film such as aluminum, chromium, nickel, iron, cobalt, copper, zinc, cadmium, tin, and alloys of the above as well. So far, our work has indicated that nickel/chromium alloys are the preferred materials.

In the preferred embodiment of the invention the plurality of dielectric layers is formed by first depositing a thin film of a lower refractive index material on the thin metal film. Typically, the thin film will have a refractive index between 1.36 and 1.50 and will have a thickness between 50 and 100 nm. These limits are dependent upon the desired result, and upon the refractive index of not only this lower index material, but also the refractive index of the higher index material. The lower index materials which are thought to be useful in the present invention includes $MgF_2$, $Al_2O_3$, $Y_2O_3$, $ThO_2$, $ThF_4$, NaF, MgO, LiF, $LaF_3$, $CeF_3$, $CaF_2$ and $AlF_3$.

These materials can be deposited in a number of ways, physical vapor deposition has been found to be the preferred method.

The alternating dielectric layers are formed from higher refractive index materials. These higher index materials are formed from various dielectrics including but not limited to CdS, $CeO_2$, $Ta_2O_5$, ZnS, and $ZrO_2$. In general, the class of "higher refractive index" materials will have refractive indices in the range of 1.50 to 2.40 as deposited. As deposited in the array called for by the present invention the coatings will be between 40 and 140 nm in thickness, although it is understood that the actual film thickness will be influenced by refractive index of the material and the desired spectral characteristics of the reflector. In general, the thickness of the layers will be a quarter wavelength in thickness of the wavelengths one wants to fully reflect.

Other film designs might use a high index material s the material being applied to the thin metal film and then have alternating layers of lower and then higher index materials form the rest of the thin film array.

The following examples illustrate some of the embodiments of the present invention. The examples are not intended to limit the scope of the invention.

EXAMPLE 1

A sheet of polysulfone plastic was cleaned by washing the surface with methanol and dried under a dry $N_2$ stream. The surface was then further cleaned by means of glow discharge accomplished by creating a electrical potential between the substrate and an electrode in an about 250 millitorr $O_2$ atmosphere. The pressure on the clean, polysulfone plastic substrate was then reduced in the vacuum chamber to $5 \times 10^{-6}$ torr. The plastic substrate is heated by means of radiant heaters in the vacuum chamber to a temperature somewhat below the "continuous use temperature" recommended by the manufacturer. In this case, the substrate was heated to about 138 degrees C.

A thin film of nickel/chromium was deposited on one of the surfaces of the substrate to a thickness of about 100 nm. The source of the nickel/chromium alloy was provided by means of electron beam-gun evaporation of the alloy per the means known to those skilled in the art of thin film physical vapor deposition.

Using the same vacuum chamber a film of $SiO_2$ approximately 77 nm thick was deposited on the nickel/chrome surface. This "lower" index material was provided from an electron beam gun evaporation source. On top of this "lower" refractive index material a thin film about 49 nm thickness composed of $TiO_2$ was deposited (the "higher" refractive index material).

Figure 3:
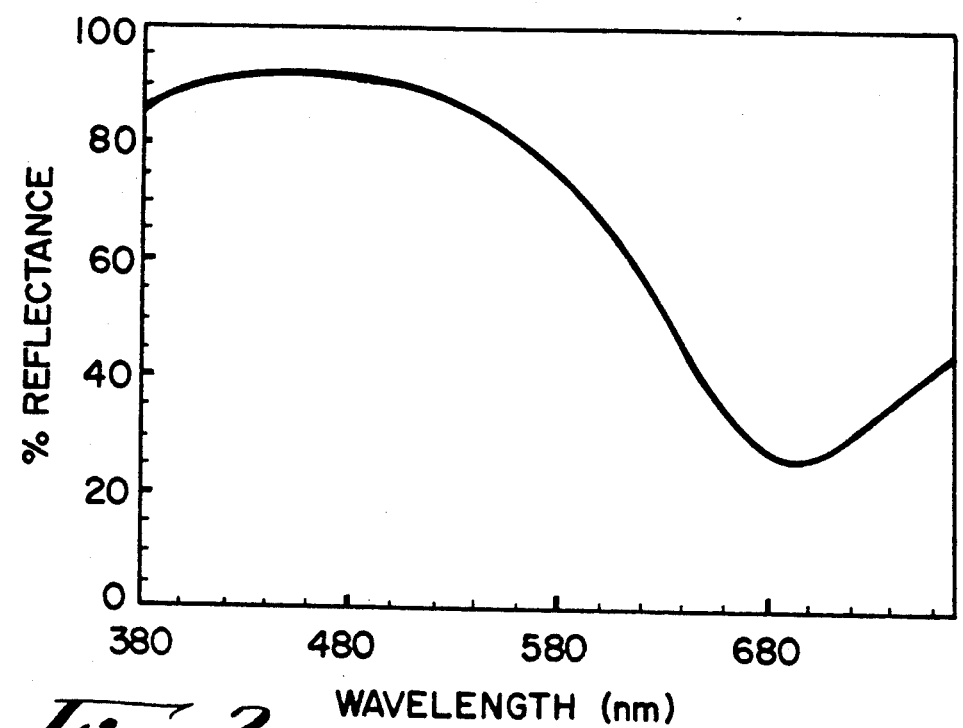
FIG. 3 shows the reflectance spectrum of a coating according to the present invention.

Another 77 nm $SiO_2$ and another 49 nm $SiO_2$ film were sequentially added to the array. The resulting film array has a reflectance spectrum represented by FIG. 3. As can be appreciated, the reflectance spectrum of the coated article measured with a source 90 degree angle to the surface of the surface of the coated substrate gives a color corrected spectrum relative to the photosource (from 3300 K to 4520 K).

Comparative Example 2

A state of the art dichroic film was deposited on a polyetherimide substrate. The design of the film employed $SiO_2$ as the lower index material, "L", and $TiO_2$ as the high index material, "H" in the following configuration.

| Film No | Material | Film Thickness (nm) |
|---|---|---|
| 1 | H | 18 |
| 2 | L | 72 |
| 3 | H | 38 |
| 4 | L | 65 |
| 5 | H | 41 |
| 6 | L | 81 |
| 7 | H | 43 |
| 8 | L | 87 |
| 9 | H | 52 |
| 10 | L | 107 |
| 11 | H | 64 |

Figure 4:
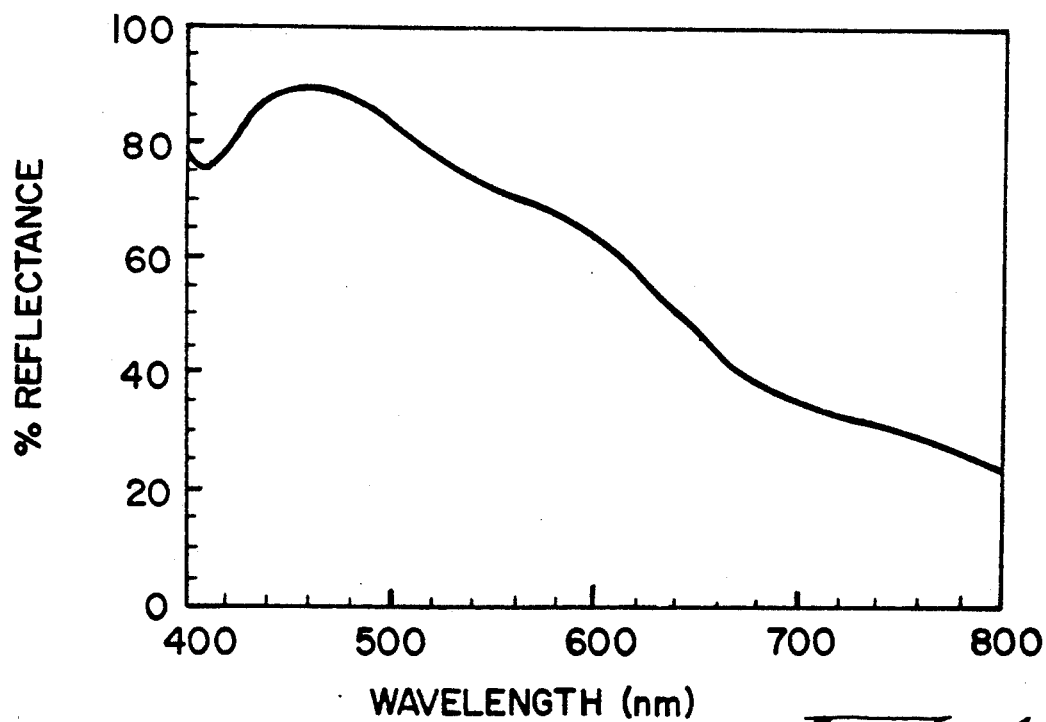
FIG. 4 shows the reflectance spectrum of the state of the art coatings on plastic substrates.

The reflectance spectrum of 3300 K black body source 90 incident to the coating is represented by FIG. 4. The color correction produced by this coating array was from 3300 K to 4530 K, very similar to that produced by the coating of Example 1 above. However, as can be appreciated from comparison of the two film reflectance spectra, the state of the art spectra has more inflection points than the coating of the present invention. These additional inflection points result in lower color rendering indices which are accepted standards for determining how close to natural light a reflected beam is. In general, higher color rendering indices are preferred for most lighting applications.

This coating on polyetherimide is described and claimed in U.S. Pat. No. 4,380,794.

Comparative Example 3

The same thin film array as described in comparative Example 2 was deposited on glass. A similar reflectance curve was achieved.

EXAMPLE 4

The same coating as described in Example 1 was applied to a polyetherimide substrate. The reflectance spectrum was essentially identical to that achieved by the reflector of Example 1.

The reflectors from Examples 2, 3 and 4 were cut into various size pieces and subjected to the following battery of tests in order to determine the durability of the optical coating on the substrate.

Test 1 a three inch long strip of standard masking tape was applied to the surface of the coating. The tape was then removed. If the coating separated from the substrate a failing rating was given.

Test 2 a sample of the coating on a piece of substrate was placed in boiling water for 12 minutes. If the coating separated from the substrate a failing rating was ascribed to the sample.

The results of the tests are summarized in the following table. The results illustrated that the coating of the present invention provides a more durable coating than was heretofore available in the art. The coating described in U.S. Pat. No. 4,380,794 was considerably less durable than the presently claimed invention.

| COMPARATIVE DURABILITY CHARACTERISTICS | | |
| --- | --- | --- |
| Sample | Test #1 Result | Test #2 Result |
| Example 1 | pass | pass |
| Example 2 | pass | fail |

EXAMPLE 5

A polysulfone reflector was cleaned per the process described in Example 1. The reflector was then coated with about 100 nm thin film of nickel which was deposited from an electron beam gun evaporator. Alternately, this thin nickel film can be applied from a resistive heated source of nickel.

On top of this thin nickel film an array of dielectric layers was deposited by means of resistive heated sources of ZnS and MgF$_2$. This array had the following configuration:

| Film No. | Thickness |
| --- | --- |
| 1 | .25 L |
| 2 | .25 H |
| 3 | .25 L |
| 4 | .25 H |
| 5 | .25 L |
| 6 | .25 H |

Figure 5:
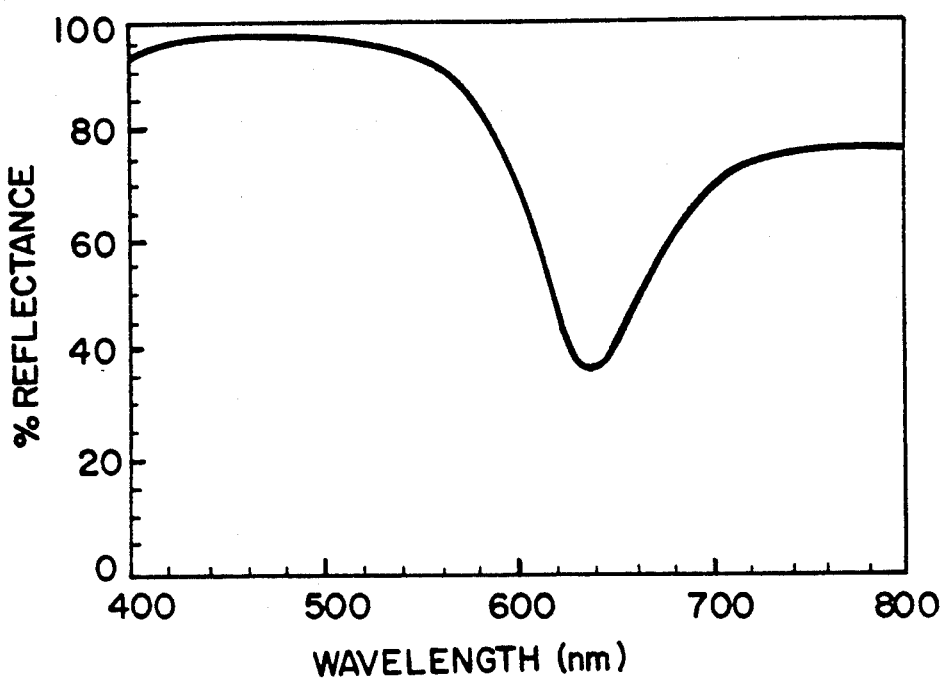
FIG. 5 shows the reflectance spectrum of a coating according to the present invention which can be deposited by resistance heating.

Thickness is shown in fractions of 450 nm wavelengths in the particular material being deposited. L signifies MgF2 and H signifies ZnS. This film gave the reflectance spectrum with a 90 incident light source with a color temperature of 3300 K as represented in FIG. 5. This film is highly reflective, more so than otherwise has been available on plastic substrates, and it accomplishes this goal with far fewer processing steps than would be required by the state of the art coatings.

EXAMPLE 6

A polysulfone reflector was coated with an about 100 nm thin film of chromium per the general procedure described in Example 1. An array of dielectric thin films was then deposited thereon which had the following configuration

| Film No. | Thickness |
| --- | --- |
| 1 | .25 L |
| 2 | .25 H |
| 3 | .25 L |
| 4 | .25 H |

Figure 6:
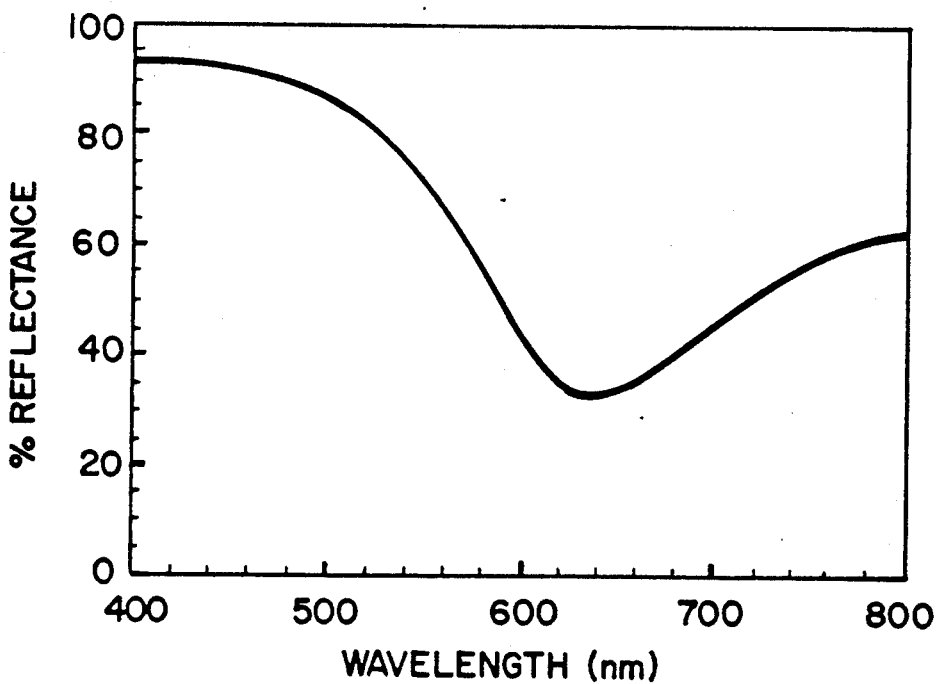
FIG. 6 shows the reflectance spectrum of a particularly durable coating according to the present invention.

Thicknesses are given in fractions of 400 nm wavelengths in the film material, which are designated "L" in the case of MgF$_2$ and "H" in the case of Ta$_2$O$_5$. The resulting coating gave the following 90 degree incident reflectance spectrum as represented in FIG. 6.

EXAMPLE 7

Figure 7:
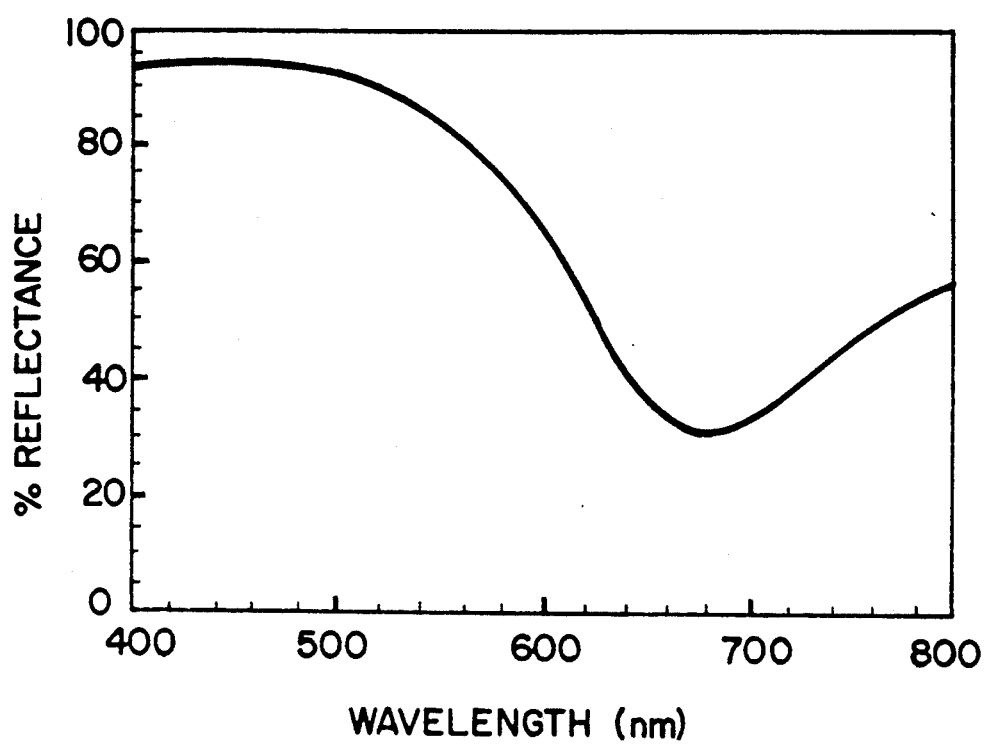
FIG. 7 shows the reflectance spectrum of a coating according to the present invention which has a particularly desirable optical characteristics.

A polysulfone reflector was coated with a 100 nm film of nickel/chrome alloy per the general procedure described in Example 1. A dielectric film array was deposited thereon of the following configuration using TiO$_2$ and MgF$_2$ which provide a high index spread between the dichroic layers. Alternating quarter wavelength (lambda equal to 430 nm) coatings of MgF$_2$ and TiO$_2$, a total of 4 film thicknesses, were applied on top of the nickel/chrome alloy film. The reflectance spectrum of the coating is represented by FIG. 7.

The previous examples demonstrate certain aspects of the present invention. They do not, however, fully delineate the scope of the invention.

What is claimed is:

1. An article for reflectance of light incident from a light source, said light source having UV, visible and IR wavelength components, comprising:
    a substrate comprising a plastic material that is stable at desired operating temperatures; and
    an optical coating deposited upon said substrate consisting essentially of
    (a) a highly reflective metal film directly deposited upon said substrate, at least 50 nm in thickness, such that said optical coated substrate is substantially effectively shielded from all incident UV light impinging upon said coated article, and
    (b) an array of thin films of alternating high index of refraction and low index of refraction dielectric materials deposited upon said metal film, said array selected such that a desired spectrum of light is reflected from said device.

2. The article of claim 1 wherein said thin metal film is an alloy of nickel and chromium.

3. The article of claim 1 wherein the array of thin films of alternating high and low index of refraction dielectric materials are alternating layers of $Ta_2O_5$ and $MgF_2$.

4. The article of claim 1 wherein the plastic substrate is polycarbonate.

5. The article of claim 1 wherein said substrate plastic material is a polysulfone, polyacrylate or polyetherimide polymer.

6. The article of claim 1 wherein said optical coating reflective metal film is nickel or chrome.

7. The article of claim 1 wherein said optical coatings array of thin films of alternating high and low index of refraction dielectric materials are alternating layers of $TiO_2$ and $SiO_2$, ZnS and $MgF_2$, $TiO_2$ and $MgF_2$ or $ZrO_2$ and $SiO_2$.

8. A light reflector in combination with a light source that emits UV visible and IR light, comprising:
   a plastic substrate forming said reflector upon which said light is incident, said substrate formed of a plastic material that is stale at desired operating temperatures; and
   an optical coating, comprising,
   (a) a metal film deposited upon said substrate, at least 50 nm in thickness, wherein UV light incident to said reflector is substantially reflected therefrom such that said substrate is effectively shielded from harm from UV radiation, and
   (b) an array of thin films of alternating high index of refraction and low refraction of dielectric materials deposited upon said metal film, said array selected such that a desired spectrum of light is reflected from said reflector, wherein the thickness of each thin film will be substantially about ¼ wavelength of the wavelengths of visible light substantially fully reflected, wherein said IR light is not reflected.

* * * * *

UNITED STATES PATENT AND TRADEMARK OFFICE
CERTIFICATE OF CORRECTION

PATENT NO. : 5,169,229

DATED : December 8, 1992

INVENTOR(S) : Bernt D. Hoppert, et al

It is certified that error appears in the above-indentified patent and that said Letters Patent is hereby corrected as shown below:

Column 4, line 4, delete "s" at the end of the sentence and insert --as-- in its place.

Column 8, line 5, delete "stale" and insert --stable-- in its place.

Signed and Sealed this

Fourteenth Day of June, 1994

Attest:

BRUCE LEHMAN

*Attesting Officer*  *Commissioner of Patents and Trademarks*